No. 781,206. PATENTED JAN. 31, 1905.
A. C. HUCKELBRIDGE.
WRENCH.
APPLICATION FILED JAN. 18, 1904.

Witnesses
E. F. Stewart
C. N. Woodward

Arthur C. Huckelbridge,
Inventor
by C. A. Snow & Co.
Attorneys

No. 781,206.

Patented January 31, 1905.

UNITED STATES PATENT OFFICE.

ARTHUR C. HUCKELBRIDGE, OF WELLINGTON, KANSAS.

WRENCH.

SPECIFICATION forming part of Letters Patent No. 781,206, dated January 31, 1905.

Application filed January 18, 1904. Serial No. 189,583.

*To all whom it may concern:*

Be it known that I, ARTHUR C. HUCKELBRIDGE, a citizen of the United States, residing at Wellington, in the county of Sumner and State of Kansas, have invented a new and useful Wrench, of which the following is a specification.

This invention relates to wrenches of the class known as "reversible" and "adjustable" wrenches, and has for its object to improve the construction and produce an implement of this character simple in construction, readily operated and applied, and in which several sizes of wrench-jaws are combined and quickly changed from one size to the other.

Another object of the invention is to produce an implement of this character which may be operated from either side and from either direction without change of structure or alteration in the adjustments.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claim made therefor.

Figure 1:
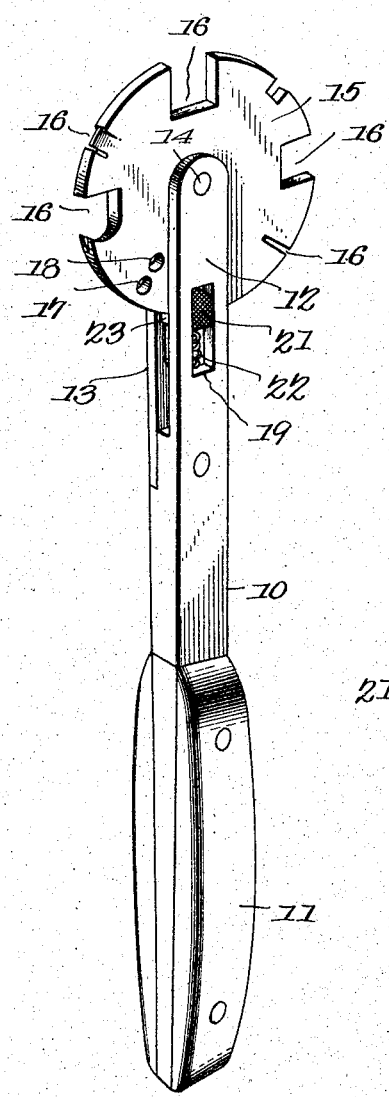
Figure 2:
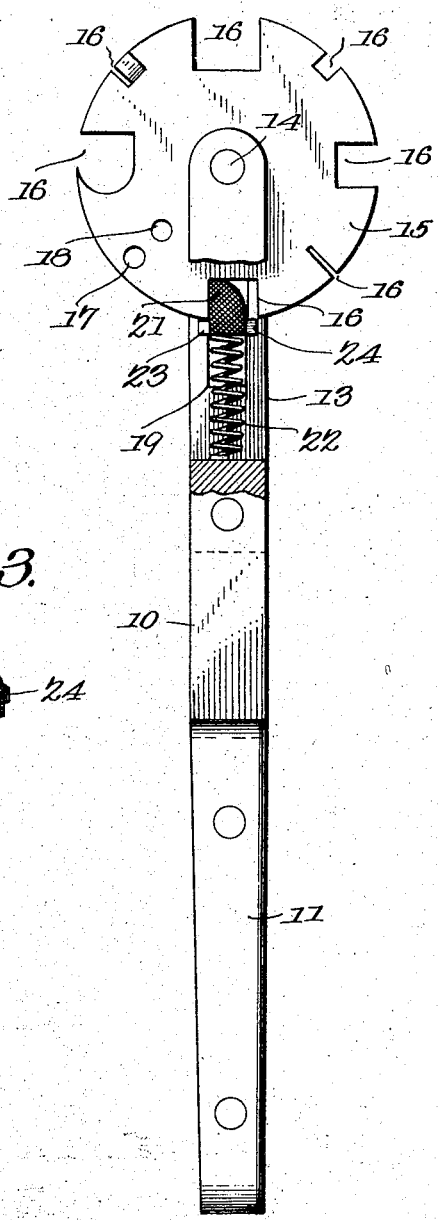
Figure 3:
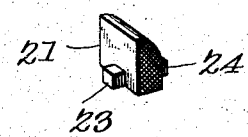

In the drawings thus employed, Figure 1 is a perspective view. Fig. 2 is a side elevation, partially in section. Fig. 3 is a perspective view of the lock-bolt detached.

The improved implement consists of a stock 10, having a handle 11 at one end and with the other end formed in forked shape by means of spaced side members 12 13, one of the side members being preferably detachable.

Mounted for rotation between the members 12 13 by a central pivot 14 is a jaw member 15, preferably of disk shape and having oppositely-disposed recesses 16 in its periphery. The recesses will preferably be of different sizes to fit different-sized nuts and may also be formed in different shapes for different purposes, but will be disposed in pairs upon opposite sides of the jaw member, so that two of the recesses will at all times be positioned in longitudinal alinement with stock and the side members 12 13. For the purpose of illustration one of the recesses is in the form of a narrow slit or cleft, another in the form of a narrow cleft with one side wedge-shaped to enable it to be employed as a saw-set. Another recess has a claw for drawing tacks or small nails formed upon one side, while at another point spaced apertures 17 18 are formed to serve as a wire-twisting device, and other forms of recesses may be employed as required.

The members 12 13 are provided with oppositely-disposed transverse longitudinal apertures 19 20, through which a bolt 21 extends, the free slightly-extended ends being roughened to afford a gripping means for the fingers of the operator. The bolt 21 is maintained yieldably by a spring 22 in engagement with the periphery of the jaw member 15 or within the particular cavity 16 which for the time being is in position to receive it and is inclined on one side, so that the member 15 may be rotated in one direction if sufficient force is applied to overcome the spring. The bolt 21 is provided with lateral projections 23 24, which operate in the cavities between the members 12 13 to maintain the bolt in position. By this arrangement as the member 15 is rotated the bolt will consecutively enter the recesses 16 and effectually prevent rotation in one direction while permitting rotation in the opposite direction. Thus any desired recess may be presented for action and held rigidly from movement when the handle member is turned in one direction, but yieldable when turned in the opposite direction.

When a nut is to be set upon its bolt, the implement will be turned with one face of the jaw member 15 toward the body held by the bolt, and when the nut is to be removed the position of the implement is reversed, and as both sides are free from obstructions it is obvious either side may be presented to the work. The implement is thus very convenient for use and may be employed for a great variety of purposes.

The implement may be constructed of any suitable material and of any required size and will be especially adapted to the use of farmers and others requiring an implement of this character.

Having thus described the invention, what is claimed is—

A wrench comprising a bifurcated handle with corresponding longitudinal slots in the opposite sides of the bifurcation, a rotatable head pivoted within the bifurcation and projected through opposite sides thereof and beyond the adjacent end of the handle, the outer peripheral edge of the disk being provided with a series of nut-receiving notches, and a spring-pressed bolt working in the bifurcation with its opposite ends working in the slots and accessible therein for adjustment, opposite sides of the bolt being provided with projections working in the bifurcation and overlapping the edges of the slots to prevent lateral displacement of the bolt.

In testimony that I claim the foregoing as my own I have hereto affixed my signature in the presence of two witnesses.

ARTHUR C. HUCKELBRIDGE.

Witnesses:
    JOHN CAMP,
    CLARA BAUMAN.